United States Patent
Chung et al.

(10) Patent No.: US 7,124,184 B2
(45) Date of Patent: Oct. 17, 2006

(54) HOME NETWORKING SYSTEM HAVING ALIVE AND CONNECTION TERMINATION MESSAGES AND METHOD FOR OPERATING SAME

(75) Inventors: Jong Hoon Chung, Kyungki-do (KR); Sang Kyun Lee, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/913,731

(22) Filed: Aug. 5, 2004

(65) Prior Publication Data

US 2005/0234568 A1    Oct. 20, 2005

(30) Foreign Application Priority Data

Apr. 19, 2004    (KR)    ............. 10-2004-0026793

(51) Int. Cl.
*G06F 15/173* (2006.01)

(52) U.S. Cl. .............. 709/224; 709/203; 709/208; 340/310.16; 340/3.51; 340/3.6; 340/286.02; 340/825.52; 710/19; 710/46; 710/109; 370/310; 370/346; 370/420

(58) Field of Classification Search .......... 700/9, 700/12, 21; 702/188; 709/203, 208, 223, 709/224, 217, 238; 710/3, 4, 15–19, 44, 710/46, 109; 714/1, 25, 43, 44, 46, 47; 379/92.01, 379/93.01; 370/310, 242, 245, 346, 449, 370/451, 420; 340/500, 533, 538, 539.1, 340/539.14, 3.1, 3.5, 3.51, 3.6, 825.52, 310.11, 340/286.01, 286.02, 310.16
See application file for complete search history.

(56) References Cited

U.S. PATENT DOCUMENTS

| | | | |
|---|---|---|---|
| 5,436,510 A * | 7/1995 | Gilbert ............... 307/38 |
| 5,485,370 A * | 1/1996 | Moss et al. ............... 709/217 |
| 5,694,547 A | 12/1997 | Subramanian et al. |
| 6,389,339 B1 * | 5/2002 | Just ............... 701/33 |
| 6,621,827 B1 * | 9/2003 | Rezvani et al. ........... 370/449 |
| 6,658,474 B1 * | 12/2003 | Kang ............... 709/227 |
| 6,768,720 B1 * | 7/2004 | Kamstra et al. ........... 370/245 |
| 6,792,323 B1 * | 9/2004 | Krzyzanowski et al. ...... 700/90 |
| 6,838,986 B1 * | 1/2005 | Shteyn ............... 340/531 |
| 2002/0004711 A1 * | 1/2002 | Sato et al. ............... 702/188 |
| 2002/0112058 A1 | 8/2002 | Weisman et al. |

(Continued)

FOREIGN PATENT DOCUMENTS

EP    0 967 766 A    12/1999

(Continued)

*Primary Examiner*—Crystal J. Barnes
(74) *Attorney, Agent, or Firm*—Lee, Hong, Degerman, Kang & Schmadeka

(57) ABSTRACT

A home network system for controlling one or more home appliances connected to a network and a method for operating the same. If an alive message or a connection termination message is normally generated from the home appliance, or if the alive message or the connection termination message is not normally transmitted to a network manager due to a transmission failure in a communication path, the network manager automatically recognizes a network connection state of the home appliance using a network search process, performs a connection termination operation according to the recognized information, and updates network information, resulting in increased reliability and user's convenience of the home network system.

13 Claims, 6 Drawing Sheets

U.S. PATENT DOCUMENTS

| | | | |
|---|---|---|---|
| 2004/0006647 A1* | 1/2004 | Kim et al. | 709/249 |
| 2004/0117068 A1* | 6/2004 | Lee | 700/275 |
| 2004/0243684 A1* | 12/2004 | Ha et al. | 709/208 |
| 2005/0149642 A1* | 7/2005 | Choi et al. | 710/15 |
| 2005/0184852 A1* | 8/2005 | Lee | 340/3.1 |
| 2005/0198663 A1* | 9/2005 | Chaney et al. | 725/38 |
| 2005/0203647 A1* | 9/2005 | Landry et al. | 700/83 |

FOREIGN PATENT DOCUMENTS

| | | |
|---|---|---|
| EP | 1542399 A1 * | 6/2005 |
| WO | WO 02/060124 A2 | 8/2002 |

* cited by examiner

HOME NETWORKING SYSTEM HAVING ALIVE AND CONNECTION TERMINATION MESSAGES AND METHOD FOR OPERATING SAME

CROSS-REFERENCE TO RELATED APPLICATIONS

Pursuant to 35 U.S.C. §119(a), this application claims the benefit of the Korean Patent Application No. 10-2004-26793, filed on Apr. 19, 2004, which is hereby incorporated by reference as if fully set forth herein.

BACKGROUND OF THE INVENTION

1. Field of the Invention

The present invention relates to a home network system for controlling one or more home appliances over a wired- or wireless-network implemented in a building, and more particularly to a home network system and a method for operating the same, which can automatically recognize a network connection state of the home appliance even though a network manager for controlling the flow of signals over the network abnormally receives an alive message or a connection-termination message from one or more home appliances connected or unconnected to the network, and can update a network information DB (database), resulting in increased reliability of control operations of the home appliance.

2. Description of the Related Art

FIG. 1 is a conceptual diagram illustrating a conventional home network system.

Referring to FIG. 1, a network N has been implemented in a building, and has widely used a variety of lines, for example, power lines and LAN (Local Area Network) lines, etc.

One or more home appliances C1~C4, and a home server HS for centrally controlling the home appliances C1~C4 are interconnected over the network to establish data communication between the home appliances C1~C4 and the home server HS, such that the home server HS can control operations of the home appliances C1~C4, and can monitor their states.

For example, the home appliances C1~C4 may be determined to be a washing machine, a microwave oven, and a TV, etc., and is indicative of a home appliance capable of performing a corresponding operation upon receiving a control signal from the home server HS.

The home server HS act as a server for controlling the flow of signals communicating with the network N, can centrally control operations of the home appliances C1~C4, and can also monitor states of the home appliances C1~C4. It should be noted that the home server HS is substantially equal to a network manager.

As shown in FIG. 1, an Internet refrigerator operated to perform predetermined signal processing operations 24 hours a day is adapted as a server for illustrative purposes.

In this case, if the home appliances C1~C4 are initially connected to the network N, they transmit an alive message informing the network N of the initial connection to a network manager HS.

If the home appliances C1~C4 are disconnected from the network, a connection termination message informing the network N of the non-connection state is transmitted to the network manager HS, such that a user can easily recognize network connection states of individual home appliances using the network manager HS.

If the network N is implemented with a wired network, the alive message or the connection termination message having been received from the home appliances C1~C4 can be transmitted to the network manager HS without losing data on a transmission path at high success probability. If the network N is implemented with a wireless network, it has different transmission rates according to variable communication network states, and considerably reduces the probability of transmitting data to the network manager HS due to noise.

In more detail, if the home appliances C1~C4 are initially connected to or disconnected from the network when a wireless network such as a wireless LAN (Local Area Network) is used, an alive message or a connection termination message is wirelessly transmitted to the network manager HS.

However, the message wirelessly transmitted from the home appliances C1~C4 may encounter transmission delay or loss data according to wireless communication network state information, such that the network manager HS cannot correctly recognize whether the home appliances are connected to or disconnected from the network.

The aforementioned problems unavoidably arise even when the network N is configured in the form of power lines. Particularly, it is impossible to block signal transmission between neighbors, the conventional home network system cannot transmit the alive message or the connection termination message to the corresponding network manager HS in a building causing mutual interference of signals, resulting in reduced control reliability.

Also, even in the case of using power lines connected to the network N, the home appliances cannot transmit the connection termination message to the home server home-appliance HS when the connection between the home appliances C1~C4 and the network is compulsorily severed because power lines of the home appliances C1~C4 are disconnected from a power-supply socket receiving power source, such that the network manager cannot recognize a non-connection state between the home appliances and the network.

SUMMARY OF THE INVENTION

Therefore, the present invention has been made in view of the above problems, and it is an object of the invention to provide a home network system and a method for operating the same, which can enable a network manager to automatically recognize whether one or more appliances are connected to the network irrespective of category and communication state information of the network, and can update network information, resulting in a highly reliable network.

It is another object of the invention to provide a home network system and a method for operating the same, which can automatically recognize a network connection state even though a network manager does not normally receive either an alive message or a connection termination message from one or more home appliances due to communication failure.

In accordance with one aspect of the present invention, these objects are accomplished by providing a home network system comprising: one or more home appliances controlled by a control signal communicating with a network configured in a building, transmitting an alive message indicative of a normal operation state or a connection termination message indicative of a disconnection state; and a network manager for transmitting/receiving signals to/from the home appliance over the network to perform an operation control function and a state monitoring function of the home appliance, and automatically disconnecting a corresponding home appliance from the network either when the home appliance is not found in the network on the condition that there is no alive message received from the home appliance during a predetermined period of time, or when receiving the connection termination message from the home appliance.

Preferably, the home appliance includes a network modem to establish data communication over the network, and a microprocessor for performing a corresponding operation associated with a received control signal.

Preferably, a variety of home appliances may be adapted to the present invention, and a variety of networks, for example, wired LANs, wireless LANs, and power lines, etc.

Preferably, the microprocessor of the home appliance generates an alive message to indicate that the home appliance is normally connected to the network or a connection termination message to indicate that the home appliance is disconnected from the network.

Preferably, the network manager detects the flow of signals communicating with the network, and monitors state information of one or more home appliances connected to the network.

Preferably, upon receiving a connection termination message from a predetermined home appliance, the network manager automatically terminates the connection between the home appliance and the network, and updates/stores the network information.

Preferably, upon no alive message from the home appliance during a predetermined period of time, the network manager determines whether a corresponding home appliance having no alive message is connected to the network. If it is determined that the corresponding home appliance is not connected to the network, the network manager automatically terminates the connection between the home appliance and the network, and updates/stores the network information.

Preferably, for the aforementioned operations, the home appliance transmits an alive message and its transmission period message to the network manager to indicate that the home appliance connected to the network is in a normal operation state. Upon receiving no alive message from the home appliance during the transmission period, the network manager determines whether the network is connected to the home appliance.

In this way, the network manager detects a message generated from the home appliance, and directly searches for a network when the message is not received normally, such that it determines a connection state between the home appliance and the network and updates network state information according to the determined result.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
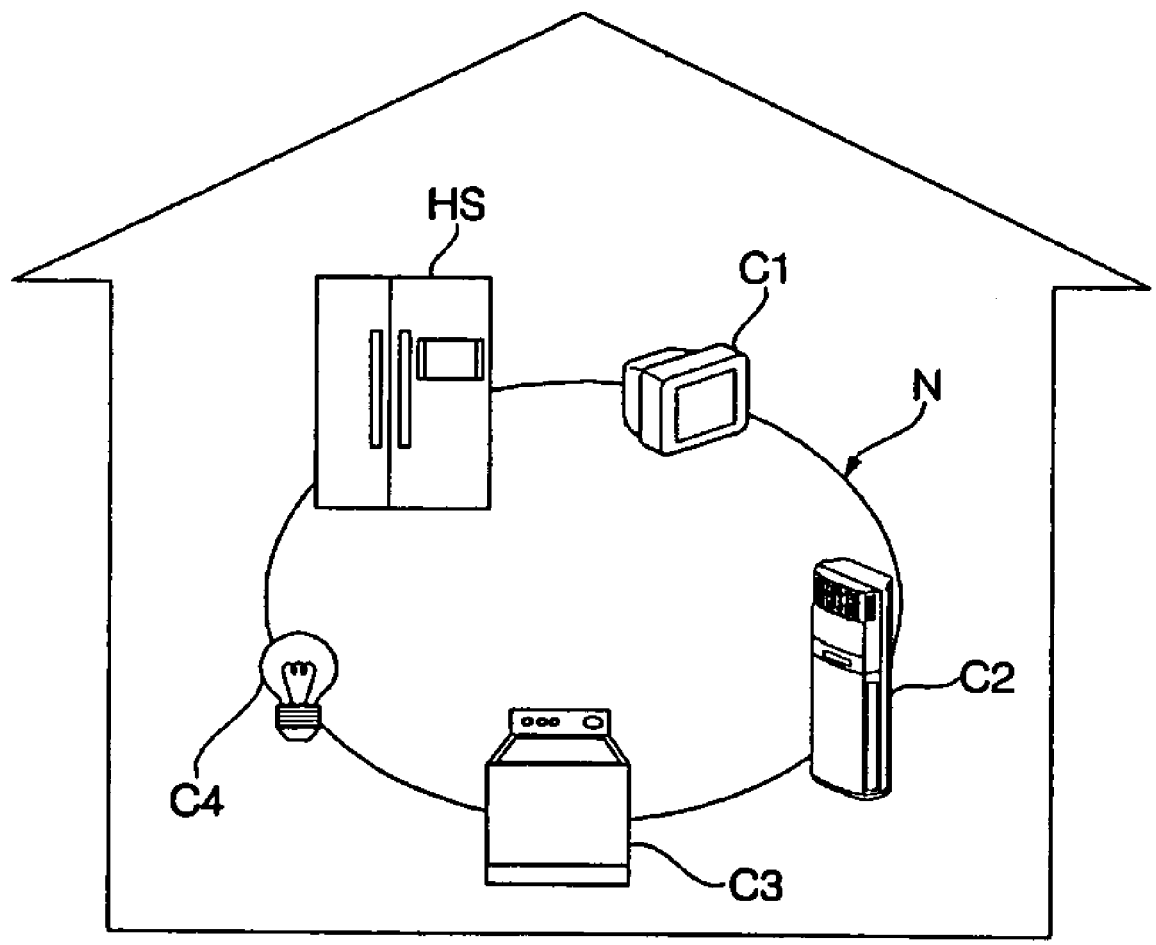
FIG. 1 is a block diagram illustrating a conventional home network system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
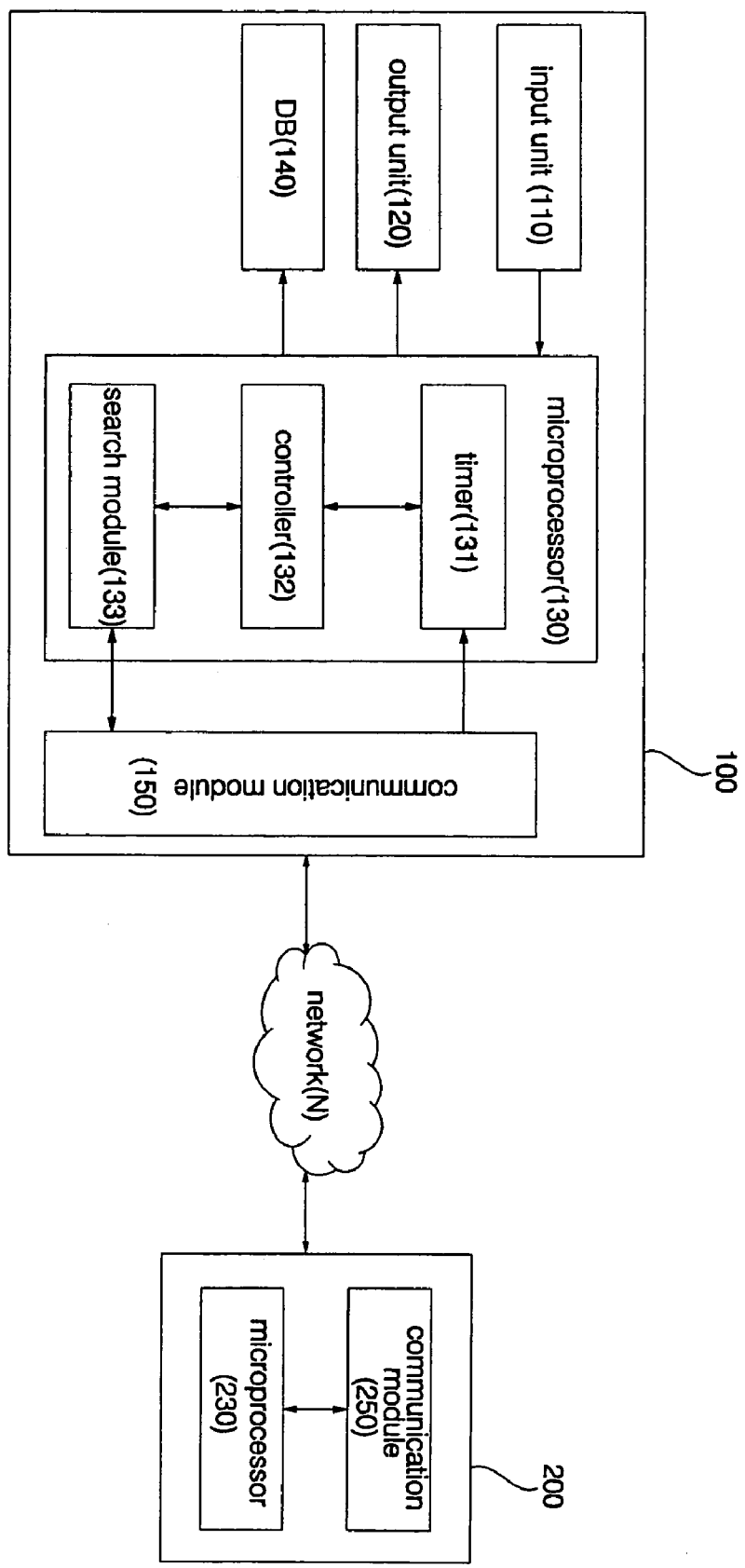
FIG. 2 is a detailed block diagram illustrating a home network system in accordance with the present invention.
Figure 3A:
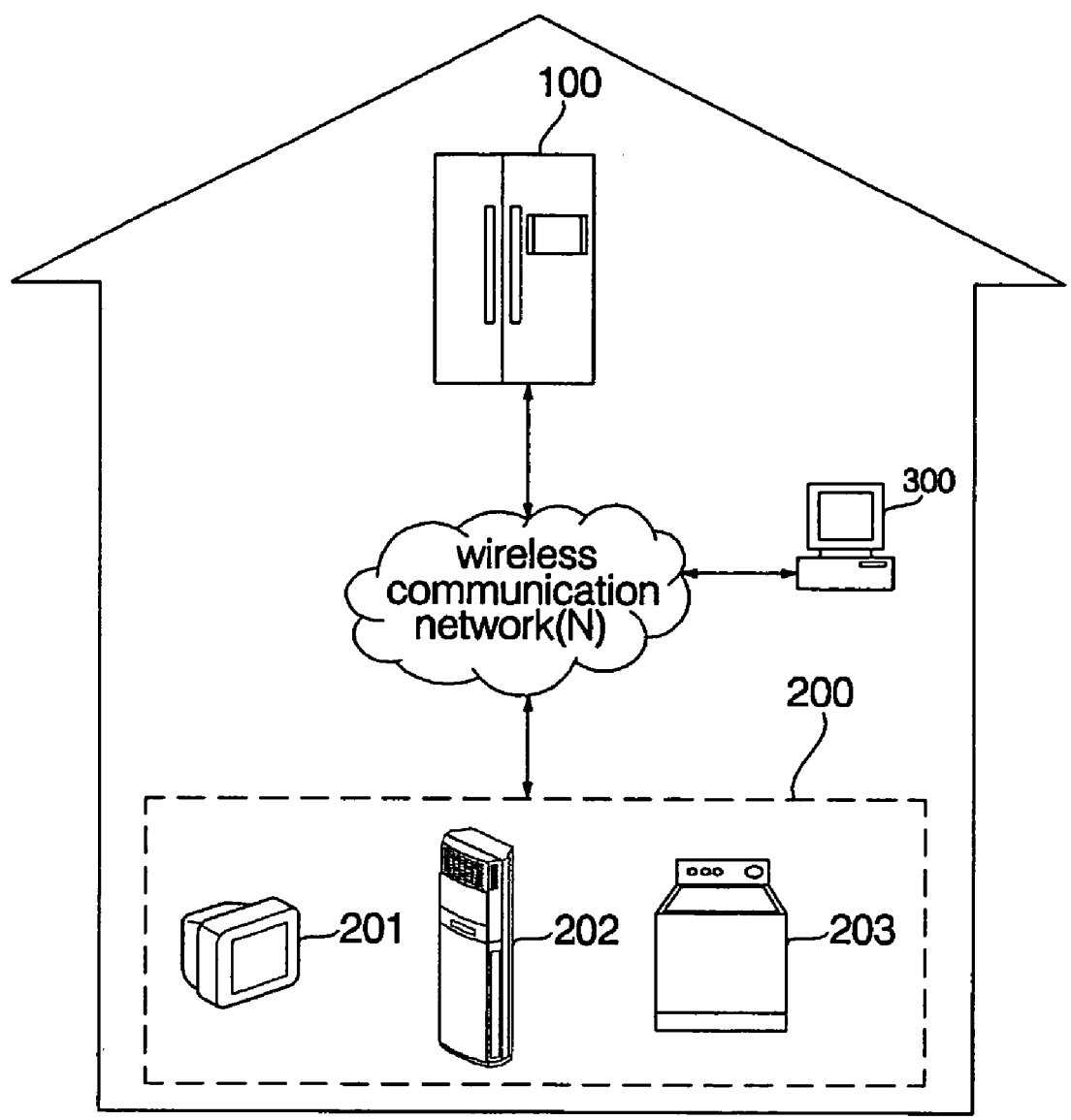
FIG. 3a is a block diagram illustrating a home network system in accordance with a preferred embodiment of the present invention.
Figure 3B:
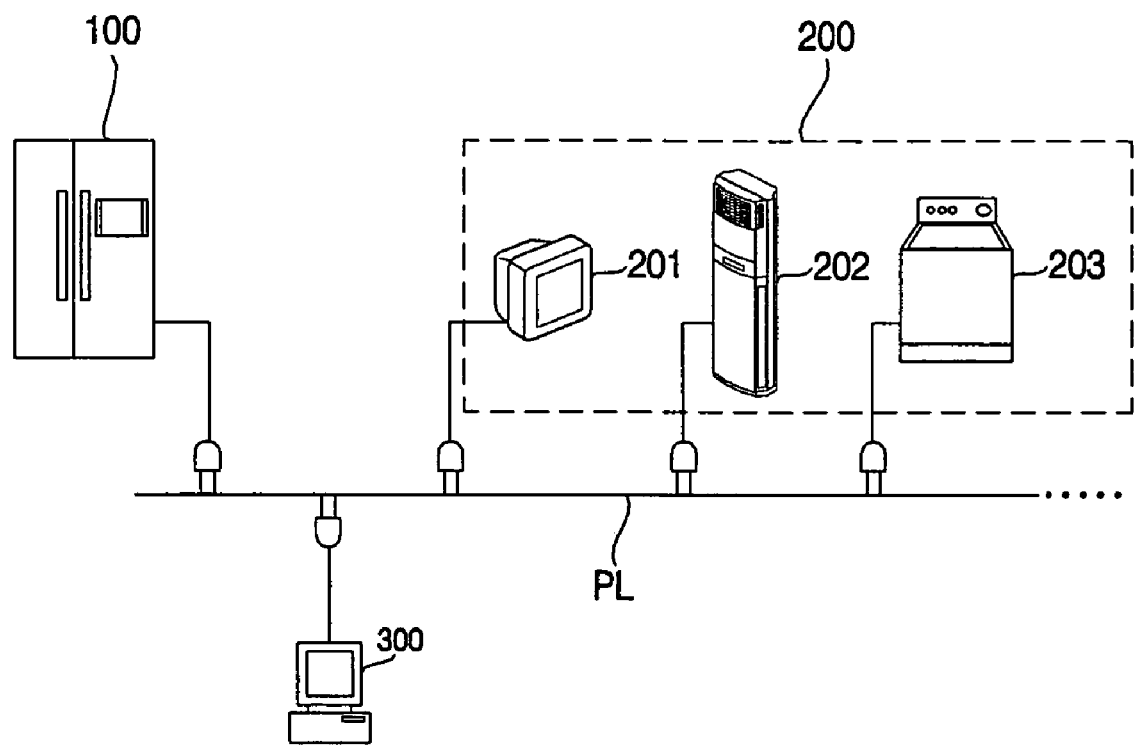
FIG. 3b is a block diagram illustrating a home network system in accordance with another preferred embodiment of the present invention.

FIG. 2 is a detailed block diagram illustrating a home network system in accordance with the present invention. FIG. 3a is a block diagram illustrating a home network system in accordance with a preferred embodiment of the present invention. FIG. 3b is a block diagram illustrating a home network system in accordance with another preferred embodiment of the present invention.

It should be noted that the network N implemented in a building to implement a home networking function has no limitation in its category information. For illustrative purposes, a home network system over a wireless network is shown in FIG. 3a, and a home network system over a wired network is shown in FIG. 3b. As shown in FIG. 3b, the home power lines PL form the network wiring, although dedicated wiring may also be used.

One or more home appliances 200 such as a television set 201, a refrigerator 202, or a stove 203 as shown in FIGS. 3a and 3b, are interconnected over the network N. For this interconnection, each home appliance 200 includes a communication module 250 for carrying out a network modem function, and a microprocessor 230 for performing a corresponding operation according to a control signal received via the communication module 250, and at the same time generating a message indicative of a connected or unconnected network state.

In this case, the message generated from the microprocessor 230 of the home appliance to indicate the network connection state is classified into an alive message and a connection termination message. The alive message is adapted to indicate a specific situation in which a corresponding home appliance is normally connected to the network N so that it is normally operated, and the connection termination message is adapted to indicate a termination of the connection between the home appliance and the network N.

In this case, the microprocessor 230 of the home appliance transmits the alive message to the network manager 100 at intervals of a predetermined transmission period. In this case, a message indicative of the transmission period is also transmitted to the network manager 100. The transmission period may be differently determined by a variety of home-appliance manufacturers.

A communication module 250 may include a wireless LAN card, a wired LAN card, and a power-line modem, etc.

The communication module 250 can also be adapted to the communication module 150 contained in the network manager 100. For example, if the network N adapts power lines, the network manager 100 and individual home appliances 200 each include a power-line communication module, so that they can be connected to the network using the power-line communication module.

One or more network managers 100 are connected to the network N, so that they can monitor connection states of individual home appliances or can control signals communicated between the home appliances and the network N. In more detail, the network manager acts as a home server capable of being driven 24 hours a day and at the same time detecting real-time state information.

Although the network manager 100 can be adapted to a variety of home appliances capable of processing digital signals, the present invention discloses an Internet refrigerator equipped with a processor while being powered on 24 hours a day for the convenience of description In more detail, the Internet refrigerator stores foodstuffs at a cool temperature, processes signals communicating over the network, and includes a user interface (UI) for enabling a user to enter a desired control command and to visually check the control-command result.

Therefore, the network manager 100 stores/manages various operation mode information of home appliances connected to the network N and detailed control contents of activated functions of the home appliances. For example, the operation mode information of home appliances may be an operation standby mode, an operation progressing mode, and an operation completion mode.

The network manager 100 includes an input unit 110 for receiving a control command from the user interface (UI), and transmitting the control command to a microprocessor 130, and an output unit 120 for generating network connection state information of a predetermined home appliance, home appliance setup information, and control result information.

In this case, the output unit 120 can be configured in the form of a touch panel integrated with the input unit 110. If a user is brought in contact with a predetermined button displayed on a screen, a control command associated with the button can be applied to the microprocessor 130, resulting in more convenient UI (User Interface) environments.

The microprocessor 130 generates a control signal to control operations of a corresponding home appliance upon receiving a control command from the UI.

Upon receiving a connection termination message from the home appliance, the microprocessor 130 recognizes that the home appliance is disconnected from the network, such that it deletes information of the home appliance.

Upon receiving no alive message during a prescribed transmission period, the microprocessor 130 determines whether a corresponding home appliance is connected to the network. If the microprocessor 130 does not detect such a home appliance connected to the network, it deletes information of the home appliance.

In this way, the network manager 100 for detecting a network connection state of a corresponding home appliance upon receiving an alive message or connection termination message from the home appliance 200 includes a database (DB) 140 connected to the network to store information of one or more home appliances and network setup information.

The network manager 100 further includes a communication module 150 configured in the form of a built-in or external device. The communication module 150 transmits a control signal to the home appliance over the network, and receives an alive message or connection termination message from the home appliance.

In this case, the microprocessor 130 includes a timer 131 for counting or timing an alive message generation period of the home appliance, i.e., a transmission period of the home appliance, and a connection-state search module 133 for determining whether a corresponding home appliance is connected to the network upon receiving no alive message during the transmission period.

The microprocessor 130 includes a controller 132. If the controller 132 receives the connection termination message from the home appliance 200 or does not search for a corresponding home appliance using the connection-state search module 133, it automatically releases a network connection state of the corresponding home appliance to control a network connection operation of the home appliance. Upon normally receiving the alive message from the home appliance within the transmission period, the controller 132 transmits an operation control signal to a corresponding home appliance.

As stated above, although the network manager 100 has been adapted as a home server device to control operations of the home appliances and monitor a network connection state of the same, it should be noted that the network manager 100 can transmit/receive data over the network N, and can use a variety of master home appliances each having a microprocessor to recognize a network connection state, for example, PCs (Personal Computers), notebook computers, and PDAs (Personal Digital Assistants).

The master home appliance 300 acts as an active home appliance opposite to a slave home appliance passively operated by a control signal received from the network N. The master home appliance 300 acting as the active home appliance is different from the home server, because it performs an operation control function and a network connection-state monitoring function and is unable to generate/assign logical addresses of individual home appliances connected to the network N.

The master home appliance 300, other home appliances 200, and the network manager 100 are interconnected as shown in FIGS. 3a~3b. FIG. 3a is a block diagram illustrating a home network system capable of performing a mutual networking function over a wireless communication network in accordance with a preferred embodiment of the present invention. FIG. 3b is a block diagram illustrating a home network system capable of performing a mutual networking function over power lines in accordance with another preferred embodiment of the present invention.

The aforementioned home network system will hereinafter be described in detail.

The home appliance connected to the network N transmits an alive message and an alive-message transmission period to the network manager 100 such that it can notify the network manager 100 of the alive message and the alive-message transmission period.

If the network manager 100 receives the alive message and its transmission period from the communication module 250, the connection-state search module 133 of the microprocessor 130 searches for information of a corresponding home appliance from the DB 140. The controller 132 sets up the timer 131 according to the received alive-message transmission period.

If the DB 140 has no information associated with the home appliance transmitting the alive message, it means that the corresponding home appliance is initially connected to the network N. The controller 132 acquires home appliance information and network setup information from the initially-connected home appliance, and stores them in the DB 140.

The microprocessor 230 of the home appliance connected to the network N generates the alive message, and periodically transmits the alive message to the network manager 100, such that it can notify the network manager 100 that the home appliance is currently connected to the network microprocessor. Therefore, the network manager 100 can recognize a normal operation state between the home appliance and the network.

The network manager 100 operates the timer 131, and determines whether there is an alive message received within the transmission period. If there is no alive message received within the transmission period, the connection-state search module 133 determines whether there is a corresponding home appliance in the network.

In this case, provided that the transmission load increases or communication interference occurs according to state information of the network N, the alive message periodically transmitted from the home appliance 200 may be successfully transmitted to the network manager 100.

In order to solve the above problem, where the network manager 100 does not receive the alive message during the transmission period, it determines whether the corresponding home appliance is normally connected to the network N using the connection-sate search module 133, instead of immediately releasing a network connection state of the home appliance 200.

Therefore, if the connection-state search module has determined that the corresponding home appliance exists in the network, the network manager 100 maintains the connection between the home appliance 200 and the network N.

Provided that the connection between the home appliance 200 and the network N is compulsorily terminated even though the home appliance 200 does not transmit a connection termination message to the network manager 100, the connection-state search module 133 is unable to search for the home appliance 200 in the network N.

The controller 132 of the network manager 100 cancels a network connection mode of the home appliance 200, removes information of the home appliance 200 from the DB 140, and updates/stores network setup information.

Upon normally receiving the connection termination message from the home appliance 200, the network manager 100 cancels a network connection mode of the home appliance 200, removes information of the home appliance 200, and updates/stores the network setup information.

Therefore, upon viewing output signals of the output unit 120 contained in the network manager 100, the user can recognize the list of controllable home appliances in a standby mode, which are currently connected to the network N, and can also enter a state monitoring- or operation control-command of a predetermined home appliance using the input unit 110.

Figure 4:
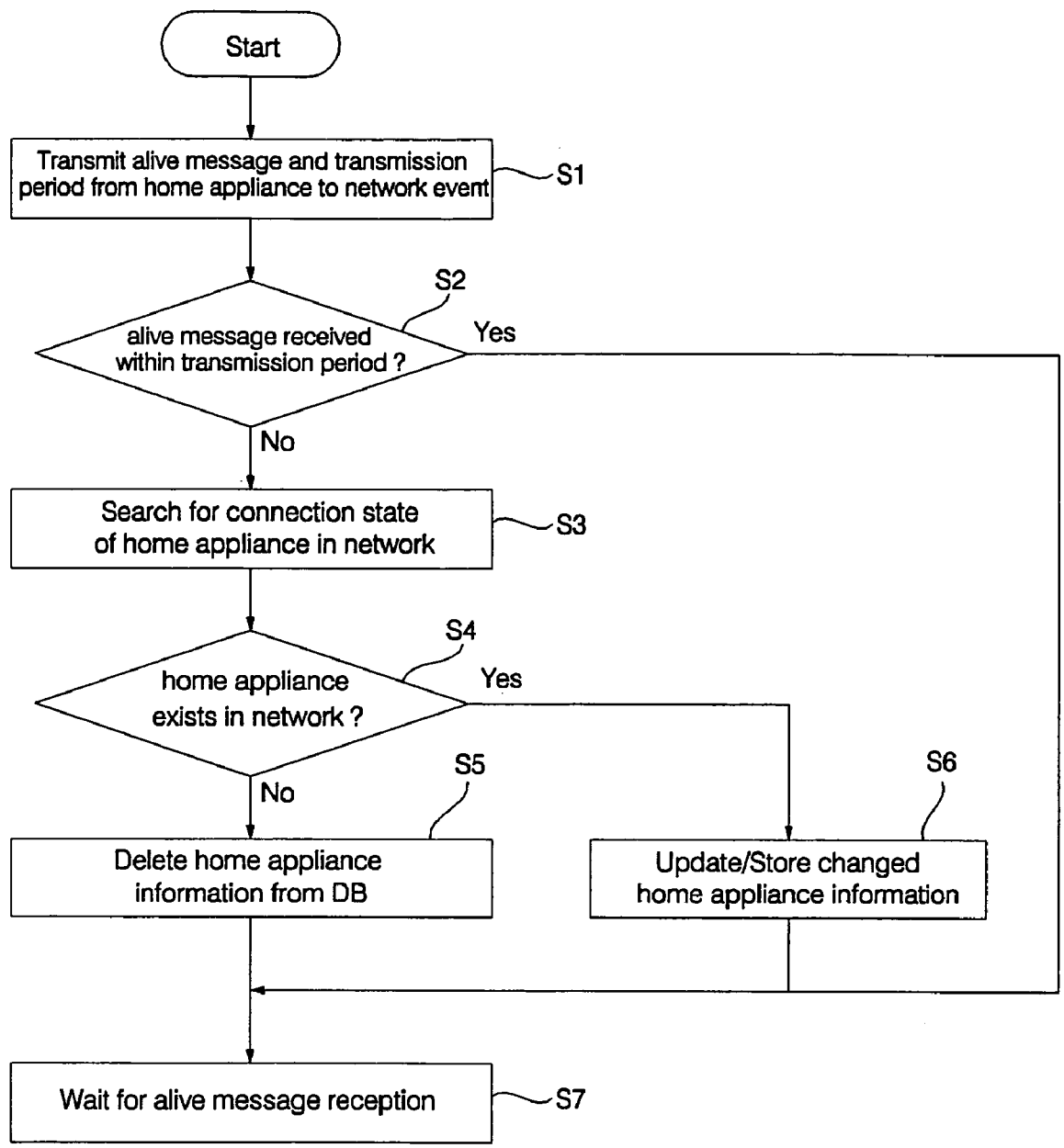
FIG. 4 is a flow chart illustrating first operations of the home network system in accordance with the present invention.

Operations of the aforementioned home network system will hereinafter be described with reference to FIG. 4. FIG. 4 is a flow chart illustrating initial operations of the home network system in accordance with the present invention.

Referring to FIG. 4, the home network system transmits an alive message and its transmission period to the network manager to indicate that one or more home appliances connected to the network are normally operated at step S1.

If the network manager does not receive the alive message during the transmission period at step S2, it determines whether a corresponding home appliance is connected to the network at step S3.

Upon receiving the determination result of step S3, if it is determined that the corresponding home appliance is not contained in the network at step S4, the network manager deletes network information of the corresponding home appliance at step S5. Otherwise, if it is determined that the corresponding home appliance is contained in the network at step S4, the network manager updates and stores network information of the home appliance at step S6, and waits for the next alive message reception at step S7.

In more detail, if the home appliance is not found in the network at step S4, the network manager determines that the connection between the home appliance and the network is terminated, removes information of the home appliance from the DB. Otherwise, if the home appliance is found in the network at step S4, the network manager determines whether the DB stores the home appliance's information or not.

In the case where state information of the home appliance is different from that of the DB, the network manager acquires current state information from the home appliance, and updates storage contents of the DB.

Particularly, a wireless communication network has some problems in that it may frequently generate an unexpected transmission delay according to network state information, may also encounter data loss due to the unexpected transmission delay, and may not transmit an alive message generated from a normal home appliance to the network manager.

Therefore, although the network manager does not receive the alive message from a corresponding home appliance, it searches for the corresponding home appliance in the network in order to determine whether the home appliance is contained in the network, instead of canceling a network connection mode of the home appliance. As a result, the network manager cancels the network connection mode of the home appliance only when the home appliance has not been contained in the network, resulting in a highly-reliable home network system.

Figure 5:
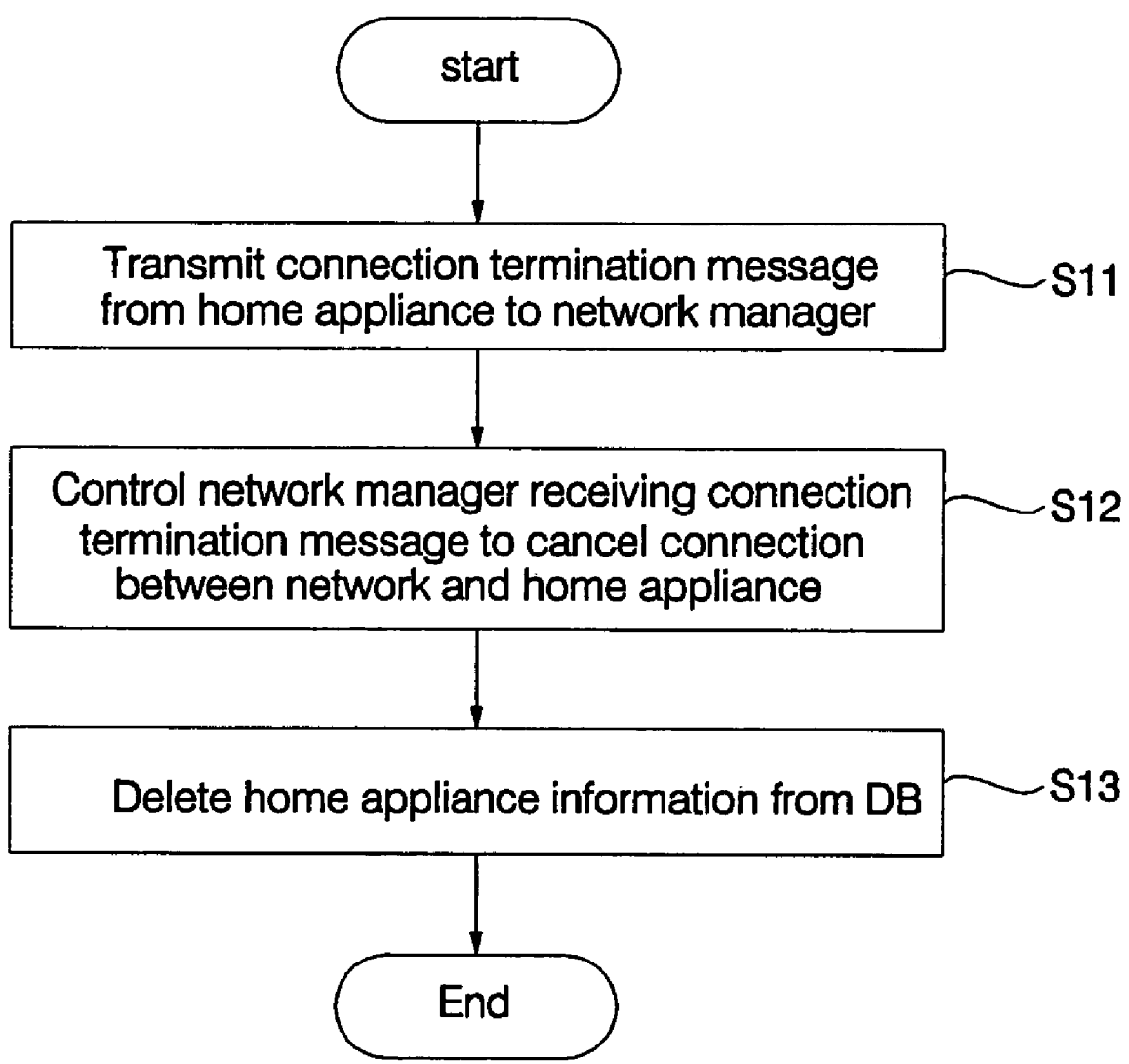
FIG. 5 is a flow chart illustrating second operations of the home network system in accordance with the present invention.

Upon receiving the connection termination message from the home appliance, the network manager cancels the network connection mode between the home appliance and the network, and its detailed description will hereinafter be described with reference to FIG. 5. FIG. 5 is a flow chart illustrating second operations of the home network system in accordance with the present invention.

Referring to FIG. 5, a home appliance having normally cancelled a network connection mode transmits a connection termination message to the network manager so as to indicate the cancellation of the network connection mode at step S11.

The network manager having received the connection termination message cancels a network connection mode of a corresponding home appliance at step S12, and removes information of the home appliance from the DB at step S13.

In the case where operation algorithms shown in FIGS. 4~5 are implemented in the network manager, the network manager checks the alive message generated from the home appliance at intervals of a transmission period, such that it can detect and output network connection state information of currently-controllable home appliances.

If the home appliance does not receive the connection termination message because its operation is abnormally or compulsorily terminated, or if the connection termination message is not transmitted to the home appliance due to a unstable network state, the network manager can normally cancel a network connection mode of the home appliance using the aforementioned search step.

As apparent from the above description, a home network system of the present invention can automatically recognize network connection state information of a corresponding home appliance even though its network manager does not receive an alive message or a connection termination message, and updates network information on the basis of the recognized information, such that a user can check the list of currently-controllable home appliances, resulting in greater convenience for the user.

As a result, the present invention can enhance convenience of the user, resulting in increased control reliability of the home network system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home network system comprising:
    one or more home appliances controlled by a control signal communicating with a network configured in a building, transmitting a connection termination message indicative of a disconnection state; and
    a network manager for transmitting/receiving signals to/from the home appliance over the network to perform an operation control function and a state monitoring function of the home appliance, and disconnecting a corresponding home appliance from the network when receiving the connection termination message from the home appliance.

2. The home network system according to claim 1, wherein the network manager includes:
    a microprocessor for generating a control signal to control operations of the home appliance, and deleting information of the home appliance either when receiving the connection termination message from the home appliance or when the home appliance is not found in the network on the condition that no alive message is received during a predetermined period of time;
    a database (DB) for storing device information of one or more home appliances connected to the network and network setup information; and
    a communication module for enabling one or more home appliances to transmit/receive a control command, an alive message, and a connection termination message over the network.

3. The home network system according to claim 2, wherein the microprocessor includes:
    a timer for counting or timing the predetermined period of time;
    a connection-state search module for determining whether a corresponding home appliance is connected to the network upon receiving no alive message during the predetermined period of time; and
    a controller for automatically canceling a connection state between the home appliance and the network either when the connection-state search module does not search for the home appliance or when receiving the connection termination message from the home appliance, and at the same time transmitting an operation control signal to a specific home appliance having transmitted the alive message within the predetermined period of time.

4. The home network system according to claim 2, wherein the network manager includes:
    an input unit for receiving a control command from a user, and transmitting the control command to the microprocessor; and
    an output unit for generating setup information, control result information, and network connection state information of the home appliance.

5. The home network system according to claim 2, wherein the communication module is a wireless communication module for establishing data communication based on RF (Radio Frequency) signals.

6. The home network system according to claim 2, wherein the communication module is a power-line communication module for establishing data communication using power lines contained in a building.

7. The home network system according to claim 1, wherein the home appliance includes:
    a microprocessor for generating a control signal upon receiving a control command from the network manager, transmitting an alive message indicative of a normal operation state and an alive-message transmission period, and transmitting a connection termination message when the connection between the home appliance and the network is severed; and
    a communication module for enabling a control message, an alive message, and a connection termination message to communicate with the network manager.

8. The home network system according to claim 7, wherein the home appliance further includes:
    a master home appliance for generating a state monitoring signal of the home appliance connected to the network and a control signal of the same; and
    a slave home appliance for receiving a control command from an external device or receiving a control signal from the network so that it performs a predetermined operation associated with the received control command or control signal.

9. The home network system according to claim 8, wherein the master home appliance includes a memory for storing state information of the home appliance connected to the network.

10. The home network system according to claim 1, wherein one or more home appliances further transmits an alive message indicative of a normal operation state, and wherein the network manager automatically disconnects a corresponding home appliance from the network when the home appliance is not found in the network on the condition that there is no alive message received from the home appliance during a predetermined period of time.

11. A method for operating a home network system including one or more home appliances for transmitting/receiving signals over a network, and a network manager communicating with the home appliances over the network, comprising the steps of:
    a) transmitting a connection termination message to the network manager indicating the home appliance is in a disconnection state;
    b) upon receiving the connection termination message determining whether the network is connected to the home appliance; and
    c) deleting network information of the home appliance when the home appliance does not exist in the network, acquiring information of the home appliance when the home appliance exists in the network, updating information stored in a database (DB), and storing the updated information in the DB.

12. The method according to claim 11, wherein the step c) includes the steps of:
- c1) if it is determined that the home appliance exists in the network, determining whether information of the home appliance is stored in the DB; and
- c2) if the home appliance's information is not stored in the DB, directly acquiring the information from the home appliance using a network communication method, and updating/storing the acquired information in the DB.

13. The method according to claim 11, wherein the method further comprises transmitting an alive message and its transmission period to the network manager to indicate that the home appliance connected to the network is in a normal operation state, and if no alive message is received from any one of home appliances during the transmission period, determining whether the network is connected to the home appliance.

* * * * *